United States Patent
Burdock

(10) Patent No.: US 6,588,769 B2
(45) Date of Patent: *Jul. 8, 2003

(54) VEHICLE ROLL CONTROL

(75) Inventor: William Burdock, Sutton Coldfield (GB)

(73) Assignee: Land Rover, Warwick (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/806,256
(22) PCT Filed: Sep. 15, 1999
(86) PCT No.: PCT/GB99/03061
§ 371 (c)(1), (2), (4) Date: Mar. 27, 2001
(87) PCT Pub. No.: WO00/18595
PCT Pub. Date: Apr. 6, 2000

(65) Prior Publication Data
US 2003/0094774 A1 May 22, 2003

(30) Foreign Application Priority Data
Sep. 29, 1998 (GB) .............................. 9821062

(51) Int. Cl.⁷ .............................. B60G 17/01
(52) U.S. Cl. ............. 280/5.508; 280/5.51; 280/124.106
(58) Field of Search .............. 280/5.58, 5.51, 280/5.511, 124.106, 124.107

(56) References Cited

U.S. PATENT DOCUMENTS

| | | | |
|---|---|---|---|
| 4,616,848 A | | 10/1986 | Sugasawa et al. |
| 4,834,419 A | | 5/1989 | Kozaki et al. |
| 4,852,903 A | | 8/1989 | Tanaka et al. |
| 4,903,982 A | * | 2/1990 | Harara et al. ............ 280/5.502 |
| 4,903,983 A | * | 2/1990 | Fukushima et al. ...... 280/5.503 |
| 4,927,173 A | * | 5/1990 | Clifton, Jr. .................. 180/271 |
| 4,930,082 A | * | 5/1990 | Harara et al. .............. 280/5.51 |
| 4,953,890 A | * | 9/1990 | Kamimura ........... 280/124.106 |
| 4,986,388 A | * | 1/1991 | Matsuda ..................... 180/233 |
| 4,989,466 A | * | 2/1991 | Goodman ................... 352/243 |
| 5,322,320 A | | 6/1994 | Sahashi et al. |
| 5,362,094 A | * | 11/1994 | Jensen ................. 280/124.107 |
| 5,381,335 A | * | 1/1995 | Wolf ......................... 280/5.51 |
| 5,422,810 A | * | 6/1995 | Brunning et al. ........... 180/421 |
| 5,430,647 A | * | 7/1995 | Raad et al. .................... 180/41 |
| 5,481,459 A | * | 1/1996 | Bungeler ............. 280/124.106 |
| 5,487,006 A | | 1/1996 | Kakizaki et al. |
| 5,510,986 A | * | 4/1996 | Williams ...................... 701/38 |
| 5,510,989 A | * | 4/1996 | Zabler et al. .................. 701/1 |
| 5,513,108 A | * | 4/1996 | Kishimoto et al. ........ 280/5.51 |

FOREIGN PATENT DOCUMENTS

| | | |
|---|---|---|
| EP | 0 167 159 | 1/1986 |
| EP | 0 465 849 A2 | 1/1992 |
| GB | 2 209 506 A | 5/1989 |
| GB | 2 214 473 A | 9/1989 |

* cited by examiner

Primary Examiner—Lesley D. Morris
Assistant Examiner—Paul Royal, Jr.
(74) Attorney, Agent, or Firm—Davis & Bujold, P.L.L.C.

(57) ABSTRACT

A vehicle roll control system uses two accelerometers (38, 40) on the vehicle to detect body roll and then filters out higher frequency roll movements as indicative of a rough road surface. The system also monitors vehicle speed, and increases roll stiffness in response to measured increase in vehicle speed, but decreases roll stiffness in response to detected rough road surfaces.

8 Claims, 3 Drawing Sheets

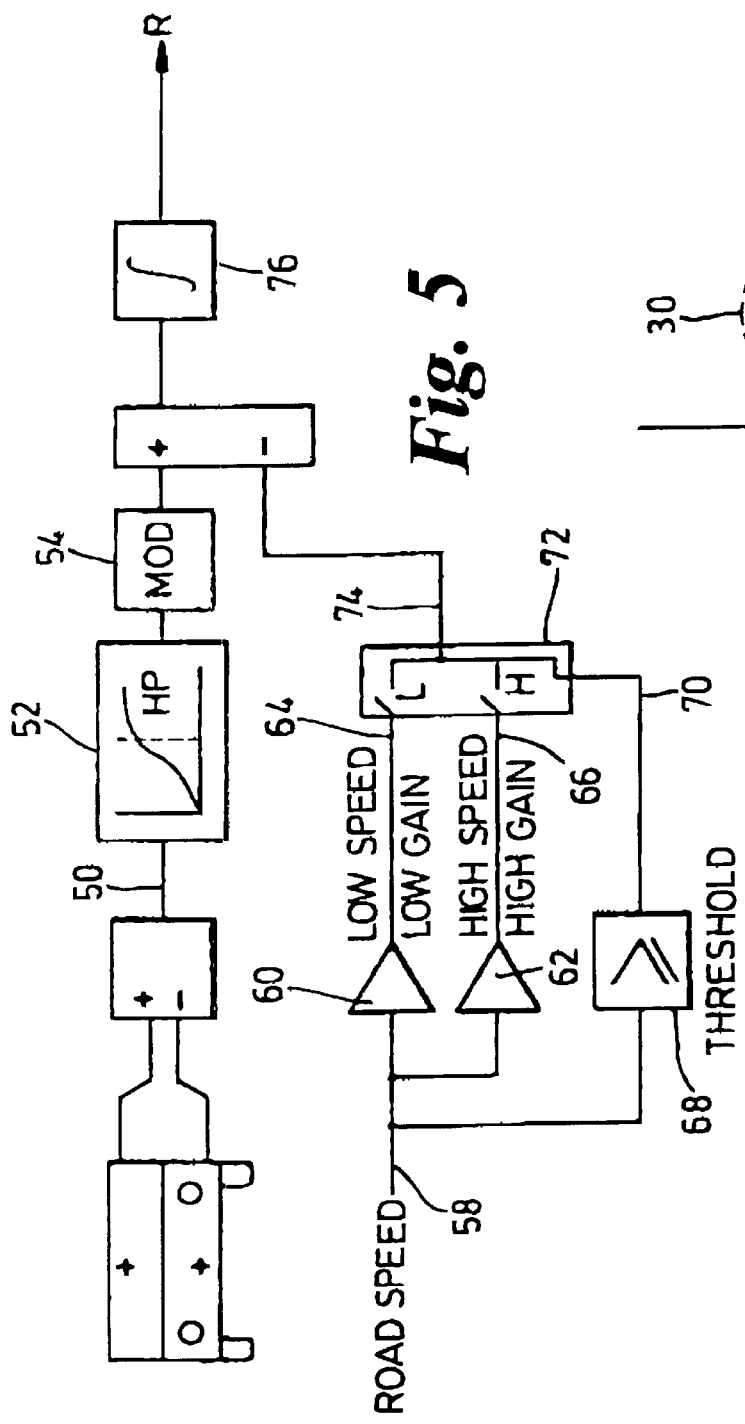
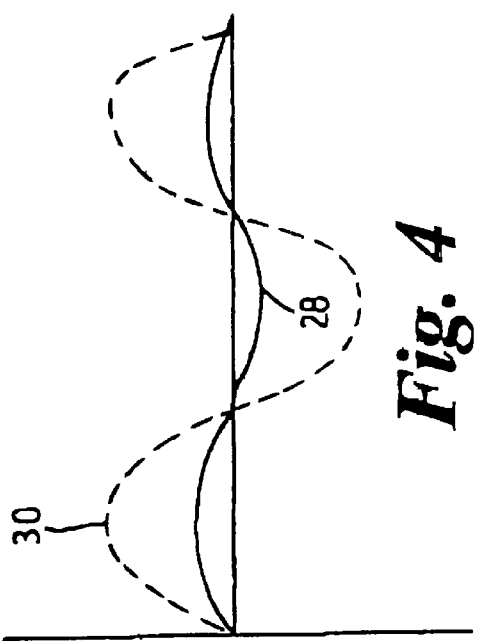

VEHICLE ROLL CONTROL

The present invention relates to active suspension systems for vehicles, and in particular to such systems which include active roll control.

BACKGROUND OF THE INVENTION

It is known from U.S. Pat. No. 5,487,006 to provide a vehicle suspension system in which a single lateral accelerometer is used to give an indication of the nature of the surface over which the vehicle is travelling. However this system suffers from the disadvantage that it cannot clearly distinguish between lateral acceleration of the whole vehicle, and lateral acceleration caused by body roll produced by a rough road surface.

The present invention provides apparatus for detecting the roughness of a surface over which a vehicle is travelling, the apparatus comprising roll detection means for measuring roll movements of the vehicle, filtering means for detecting high frequency roll movements, and control means arranged to measure the said roughness by measuring the level of said high frequency roll movements.

SUMMARY OF THE INVENTION

Preferably the roll detection means comprises a pair of accelerometers located on the sprung part of the vehicle at different distances from the roll axis of the vehicle.

Preferably the accelerometers are vertically spaced and each accelerometer is arranged to detect acceleration in a direction which is lateral to the vehicle.

Preferably the control means is arranged to monitor the measured acceleration from each of the accelerometers, to produce a roll signal dependent on the difference between the two measured accelerations said roll signal being indicative of instantaneous vehicle roll.

Preferably said difference is an integral over time of the instantaneous difference between the measured accelerations, or the difference between respective integrals over time of the two measured accelerations.

The present invention further provides a vehicle suspension system including apparatus according to the invention wherein the control means is arranged to control the roll stiffness of the vehicle, and is arranged to reduce the roll stiffness of the vehicle in response to the detection of increased surface roughness.

Preferably the system further comprises vehicle speed detection means wherein the control means is arranged to increase the roll stiffness in response to increasing vehicle speed.

The present invention also provides a vehicle suspension system comprising roll control means for controlling the roll stiffness of the vehicle, roughness measuring means for measuring the roughness of the surface over which the vehicle is travelling, vehicle speed measuring means for measuring the speed of the vehicle wherein the roll control means is arranged to increase the roll stiffness if the vehicle speed increases but to decrease the roll stiffness of the roughness of the surface over which the vehicle is travelling increases.

BRIEF DESCRIPTION OF THE DRAWINGS

Preferred embodiments of the present invention will now be described by way of example only with reference to the accompanying drawings in which:

FIG. 4 is a graph showing the output from sensors in the vehicle of FIG. 1 when travelling on a rough road, FIG. 5 is a diagrammatic representation of the rough road detection algorithm used in the system of FIG. 1.

DESCRIPTION OF THE PREFERRED EMBODIMENTS

Figure 1:
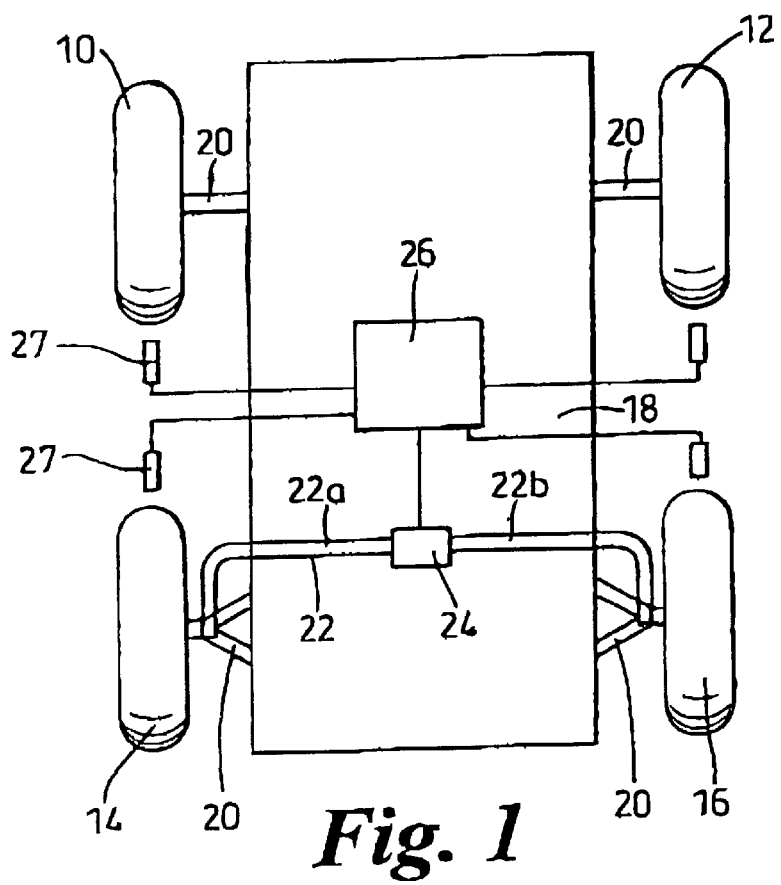
FIG. 1 is a diagrammatic representation of a vehicle including a suspension according to an embodiment of the invention.

Referring to FIG. 1, a vehicle has four wheels 10, 12, 14, 16 each mounted on the vehicle body 18 The vehicle has an independent suspension, each of the wheels being attached to the body 18 which forms the sprung part of the vehicle, through a suspension arm 20 so that it can move vertically relative to the body 18. A roll bar 22 is connected between the two rear wheels 14, 16 to control the roll of the rear of the vehicle. The roll bar 22 is split in the middle into two halves 22a, 22b which can be rotated relative to each other by a rotary actuator 24 under the control of a control unit 26 This enables vehicle roll to be controlled actively in response to signals input to the control unit from wheel speed sensors 27 and a number of accelerometers which provide signals indicative of the acceleration of parts of the vehicle body in various directions. A similar roll bar, which is not shown, would also normally be connected between the front wheels 10, 12.

Figure 2:
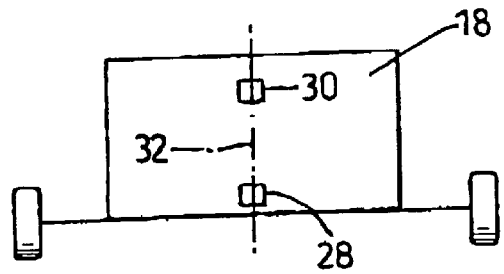
FIGS. 2 and 3 are diagrammatic end views of the vehicle of FIG. 1 when level and when under roll respectively.
Figure 3:
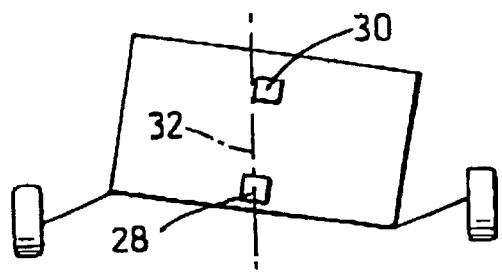

Referring to FIG. 2 the accelerometers mentioned above include two lateral accelerometers 28, 30 which are rigidly mounted on the vehicle body 18 and measure lateral acceleration of the vehicle body. The lateral accelerometers 28, 30 are vertically spaced from each other, the lower one 28 being positioned near the roll axis 32 of the vehicle, i.e. the longitudinal axis about which the vehicle tends to rotate during roll movements. The upper accelerometer 30 is mounted near the top of the vehicle body 18 further from the roll axis 32. Therefore roll of the vehicle body 18 about the roll axis will cause larger lateral movements of the upper accelerometer 30 than of the lower 28.

FIG. 4 shows the signals produced when the vehicle is travelling over rough ground and the body is rolling al relatively high frequencies of the order of 10 Hz. Under these conditions the upper accelerometer 30 will detect relatively high accelerations because the top part of the body which is relatively far from the roll axis, typically 1.0 to 1.5 meters, will be moving through relatively large distances as the body rolls about the roll axis. The lower accelerometer 28, on the other hand, which is closer X the roll axis, say 0.1 or 0.2 meters above it, will detect much lower accelerations because of the smaller lateral displacements it will undergo However it will be understood that, as shown in FIG. 4, the oscillations in the two signals will be in phase with each other provided the accelerometers are both above the roll axis. (If the lower accelerometer were below the roll axis they would be in anti-phase.) The signals from the two accelerometers can therefore be analysed by the control unit to determine the amount of vehicle roll.

Referring to FIG. 5, in order to determine the roughness of the surface or road over which the vehicle is travelling, the difference between the signals from the upper and lower accelerometers 28, 30 is used to produce a difference signal 50. This signal is then filtered using a high pass filter 52 and the modulus of the filtered signal is produced at 54. This modulus signal is therefore an indication of the instantaneous amount of body roll at the high frequencies generally indicative of a rough surface. These frequencies will depend on the type of surface which is of interest, and will generally be of the order of 10 to 100 Hz.

A road speed signal 58 which increases with the road speed of the vehicle is passed through a low gain amplifier 60 and a high gain amplifier 62 to produce low gain and high gain speed signals 64, 66. A threshold device 68 monitors the vehicle speed signal and provides a relatively high threshold signal 70 if the speed signal exceeds a predetermined threshold. A switch unit 72 has an output 74 and connects the low gain speed signal to it if the vehicle speed is below a predetermined speed $V_1$, connects the high gain speed signal to it if the vehicle speed is above the predetermined speed $V_1$, and permanently connects the output from the threshold device to it.

The output from the switching device is compared with the modulus signal and the difference input to an integrator 76. The output of the integrator 76 is, at any time t, the integral over the preceding interval δ of the difference between the modulus signal and the and the output from the switching device.

Figure 6:
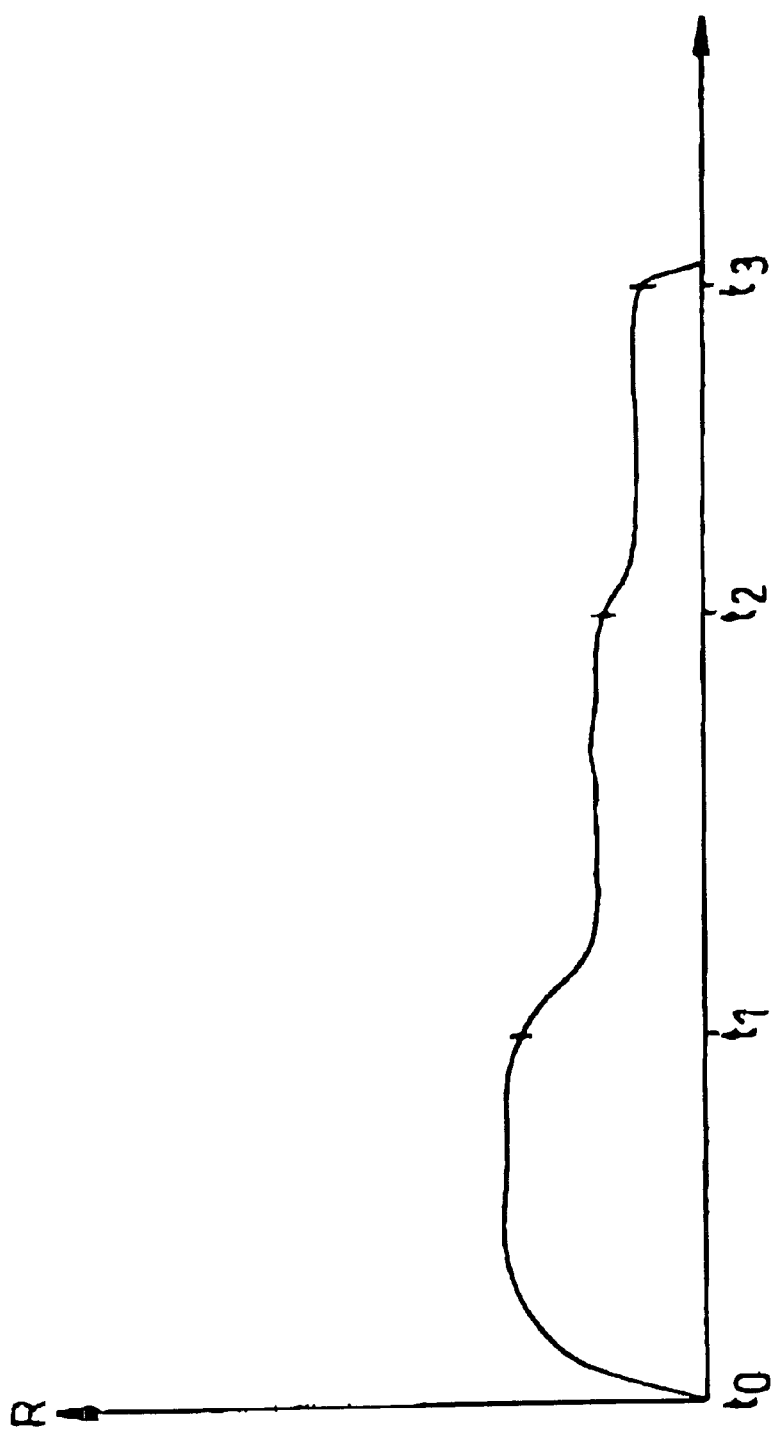
FIG. 6 is a graph showing the output produced by the algorithm of FIG. 6.

The result is that the output R from the integrator 76 will generally increase with road roughness, but will decrease with road speed as is illustrated in FIG. 6, and the control unit can control the roll stiffness of the vehicle in response. From time $t_0$ the vehicle starts off at low speed on a rough surface. This produces a high output from the integrator 76 which causes the control unit 26 to reduce the roll stiffness of the vehicle to allow the suspension to absorb the vibrations produced by the rough surface. At time $t_1$ the vehicle speed increases above the predetermined speed $V_1$ and the output from the integrator 56 therefore falls. The control unit therefore increases the roll stiffness. At time $t_2$ the road surface becomes smoother so the output from the integrator decreases again, and again the roll stiffness is increased. At time $t_3$ the vehicle speed increases above the threshold speed. The output from the threshold device is therefore input to the integrator 56, the output of which falls rapidly. The roll stiffness is therefore rapidly increased as is suitable for higher speed travel on road.

What is claimed is:

1. An apparatus for detecting the roughness of a surface over which a vehicle, having sprung part and a roll axis, is traveling, the apparatus comprising: a pair of accelerometers located on the sprung part at different distances from the roll axis, for measuring roll movements of the vehicle, filtering means for detecting high frequency roll movements, and a controller arranged to measure the roughness by measuring the level of the high frequency roll movements.

2. The apparatus according to claim 1, wherein the accelerometers are vertically spaced and each accelerometer is arranged to detect acceleration in a direction which is lateral to the vehicle.

3. The apparatus according to claim 1, wherein the controller mechanism is arranged to monitor the measured acceleration from each of the accelerometers, and to produce a roll signal dependent on the difference between the two measured accelerations, the roll signal being indicative of instantaneous vehicle roll.

4. The apparatus according to claim 3, wherein the difference is an integral over time of the instantaneous difference between the measured accelerations.

5. The apparatus according to claim 3, wherein the difference between respective integrals over time of the two measured accelerations.

6. The vehicle suspension system comprising an apparatus according to claim 1, for detecting surface roughness wherein the controller is arranged to control the roll stiffness of the vehicle, and is arranged to reduce the roll stiffness of the vehicle in response to the detection of increased surface roughness.

7. The system according to claim 6, further comprising vehicle speed sensor wherein the controller is arranged to increase the roll stiffness in response to increasing vehicle speed.

8. A vehicle suspension system comprising roll control means for controlling the roll stiffness of the vehicle, roughness measuring means for measuring the roughness of the surface over which the vehicle is traveling, vehicle speed measuring means for measuring the speed of the vehicle characterized in that the roll control means is arranged to increase the roll stiffness if the vehicle speed increases but to decrease the roll stiffness of the roughness of the surface over which the vehicle is traveling increases.

* * * * *